US007719214B2

(12) United States Patent
Leehey et al.

(10) Patent No.: US 7,719,214 B2
(45) Date of Patent: May 18, 2010

(54) METHOD AND APPARATUS FOR CONTROLLING MOTORS OF DIFFERENT TYPES

(75) Inventors: Jonathan Robert Leehey, Wayland, MA (US); James Richard Gort, Bolton, MA (US); Emanuel Gustav Lewin, Lincoln, MA (US); Peng Li, Medford, MA (US)

(73) Assignee: Performance Motion Devices, Inc., Lincoln, MA (US)

( * ) Notice: Subject to any disclaimer, the term of this patent is extended or adjusted under 35 U.S.C. 154(b) by 27 days.

(21) Appl. No.: 11/649,743

(22) Filed: Jan. 4, 2007

(65) Prior Publication Data

US 2008/0084171 A1    Apr. 10, 2008

Related U.S. Application Data

(60) Provisional application No. 60/850,370, filed on Oct. 6, 2006.

(51) Int. Cl.
*H02P 5/46* (2006.01)
(52) U.S. Cl. .................... 318/34; 318/286; 318/379; 318/802
(58) Field of Classification Search .......... 318/34, 318/802, 379, 286
See application file for complete search history.

(56) References Cited

U.S. PATENT DOCUMENTS

| 4,779,031 | A | 10/1988 | Arends et al. |
| 4,893,068 | A | 1/1990 | Evans, Jr. |
| 6,191,507 | B1 | 2/2001 | Peltier et al. |
| 6,211,639 | B1* | 4/2001 | Meister et al. ............ 318/568.2 |
| 6,653,810 | B2* | 11/2003 | Lo ............................. 318/569 |
| 6,865,441 | B2* | 3/2005 | Chandhoke ................ 700/189 |
| 6,888,469 | B2 | 5/2005 | Seferian |
| 6,943,521 | B2* | 9/2005 | Kurokawa et al. .......... 318/625 |
| 6,989,642 | B2* | 1/2006 | Wakefield et al. ........... 318/139 |
| 7,024,257 | B2* | 4/2006 | Pearce et al. ................. 700/72 |
| 7,064,513 | B2* | 6/2006 | Fenley ........................ 318/700 |

(Continued)

OTHER PUBLICATIONS

"New All-Digital Motion Module Delivers Advanced Features," Press Release of Performance Motion Devices, Inc. (Aug. 1, 2005).

(Continued)

*Primary Examiner*—Walter Benson
*Assistant Examiner*—David S Luo
(74) *Attorney, Agent, or Firm*—Hamilton, Brook, Smith & Reynolds, P.C.

(57) ABSTRACT

In order to reduce the time and expense of designing and operating a motor control system with multiple motors of different types, a motor control system is provided with motor control modules that monitor and record status information and update settings in a uniform manner regardless of the motor type under control. Each motor control module includes an output power stage and a motor control unit connected to each other. The status information includes status information about the output power stage or a current control loop connected to the output power stage. The settings include conditions monitored by each motor control module and corresponding actions taken by each motor control module based on the conditions. A host processor connected to the multiple motor control modules may request the common status information and send messages to update common settings of the motor control modules.

34 Claims, 10 Drawing Sheets

U.S. PATENT DOCUMENTS

| | | | |
|---|---|---|---|
| 7,194,321 B2 * | 3/2007 | Sun et al. | 318/400.01 |
| 7,259,470 B2 * | 8/2007 | Matsuoka | 290/40 C |
| 7,397,363 B2 * | 7/2008 | Joao | 340/539.11 |
| 2003/0006749 A1 | 1/2003 | Rollman | |
| 2008/0074075 A1 * | 3/2008 | Davis et al. | 318/800 |

OTHER PUBLICATIONS

"Magellan Motion Controllers," Performance Motion Devices, Inc. (2004).

"The Magellan Family of Motion Processors," Performance Motion Devices, Inc. (2005).

"Magellan Motion Processor User's Guide for MC55000 & MC58000 Series Motion Processors," Performance Motion Devices, Inc. (2003).

"PD&D Exclusive, All-Digital Motion Module," *Product Design & Development*, p. 7, (Sep. 2005).

Servo-Halbeck Press Release, Integrated Motion Controllers, servo-Halbeck GmbH & Co.KG, pp. 1-2, [retrieved on Sep. 11, 2006]. Retrieved from the Internet URL: HTTP://www.servo-halbeck.com/html/integrated_mcs.html.

* cited by examiner

METHOD AND APPARATUS FOR CONTROLLING MOTORS OF DIFFERENT TYPES

RELATED APPLICATION

This application claims the benefit of U.S. Provisional Application No. 60/850,370, filed on Oct. 6, 2006, the entire teachings of which are incorporated herein by reference.

BACKGROUND

A typical motor control system includes a host processor, motion controller, motor drive, and motor. The motion controller may accept commands over a network, such as position, velocity, acceleration, and jerk, from the host processor and generate a corresponding trajectory. The motor drive, in turn, provides an appropriate power signal to drive the motor according to the generated trajectory. Typically, the motion controller and the motor drive are designed differently for different motor types.

SUMMARY

In medical, scientific, semiconductor, automation, industrial, and robotic applications, a motor control system may utilize multiple motors of varying types. In any particular application, the system designer determines the appropriate motion controllers and motor drives to use for the different motor types. The system designer then configures each of the motion controllers in a particular way depending on the motor type which it controls. Thus, the controlling and monitoring functions of the motion controller are specific to the motor type which it controls. Therefore, there is a need for a motor controller that controls motors of different types in a uniform way.

A motor control module is provided for controlling a motor of a particular motor type. The motor control module includes an output power stage configured for a particular motor type and a motor control unit electrically connected to the output power stage. The motor control unit is configured to monitor status information about the motor control module. The motor control unit also includes status registers connected to the motor control unit. The status registers are configured in a format independent of motor type. The motor control unit is also configured to update the status information in the status registers.

The status information may include status information about the output power stage, such as a voltage input to the output power stage, temperature of the output power stage, and current output by the output power stage. In another or same embodiment, the status information may include status information about a current control loop connected to the output power stage, such as, a commanded current, measured current, difference between the commanded and measured currents, sum of an integrator of the current control loop, overall contribution of the integrator, and output command for the current control loop. The current control loop may be implemented in the motor control unit as software instructions, analog circuitry or hard-coded into an Application Specific Integrated Circuit (ASIC). The status registers may include an event status register, activity status register, output power stage status register, and signal status register. Example motor types in the motor control system include a DC brush motor, brushless DC motor, step motor, AC induction motor, and variable reluctance motor.

The motor control module may include a communications unit coupled to the motor control unit so that the communications unit may report uniform status information from the status registers to the motor control data bus. The communications unit may be configured to report the status information to a motor control data bus. The communications unit may include a serial, parallel, or Controller Area Network (CAN) interface. The motor control unit may further include a processing unit connected to the output power stage and the status registers that is configured to update the status registers with status information. The processing unit may be configured to clear at least one bit in the event status register based on a message from a host processor in communications with the motor control module.

In another example embodiment, the motor control unit is configured to update settings of the motor control module that are independent of motor type. The settings may include conditions monitored by the motor control unit and corresponding actions taken by the motor control unit. The conditions monitored by the motor control unit may include current foldback. The conditions may also include a level or threshold breakpoint trigger conditions and the actions may include breakpoint actions. The actions may include abrupt stop with position error clear, disable trajectory generator, disable position move, disable current loop, and disable motor output. The settings may also include current control loop parameters, such as, proportional gain, integrational gain, and integration limit.

A method of controlling a motor of a particular motor type is also provided. The method includes monitoring status information about a motor control module for a motor of a particular motor type. The status information is in a format independent of motor type. The method further includes updating the status information about the motor control module in status registers. The status registers may include an event status register, activity status register, output power stage status register, such as a motor drive status register, and a signal status register. The status information may be updated at regular intervals or in response to changes in the status information.

A method in accordance with another embodiment includes receiving a message to update settings of a motor control module for a particular motor type. In this embodiment, the format of the settings are independent of motor type. The method also includes updating the settings of the motor control module based on the message.

A motor control system is also provided for controlling multiple motors of different types. The motor control system includes multiple motor control modules for different motor types connected to a motor control data bus configured to carry motor control information. Each motor control module includes an output power stage configured for a particular motor type and a motor control unit connected to the output power stage. The motor control unit also includes status registers that are configured to store status information about the motor control module and the components of the motor control module that is in common with or uniform among the multiple motor control modules. The motor control unit may also be configured to update settings of the motor control module in common among the multiple motor control modules based on a message received on the motor control data bus The motor control system may further include a host controller that communicates with the multiple motor control modules through the motor control data bus. The host controller may be configured to retrieve the status information in common among the different motor types of the motor control system by sending a message to the multiple motor control modules.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

The present approach provides a system and corresponding method for controlling multiple motors of different types in a uniform manner. This system and method allows a motor control system designer to simply purchase appropriate motor control modules corresponding to the different motor types in a given motor system and to program the different motor control modules using a uniform protocol. Moreover, the system and method allows a system operator to monitor and to operate the given motor system independent of the different motor types in the given motor system.

Figure 1:
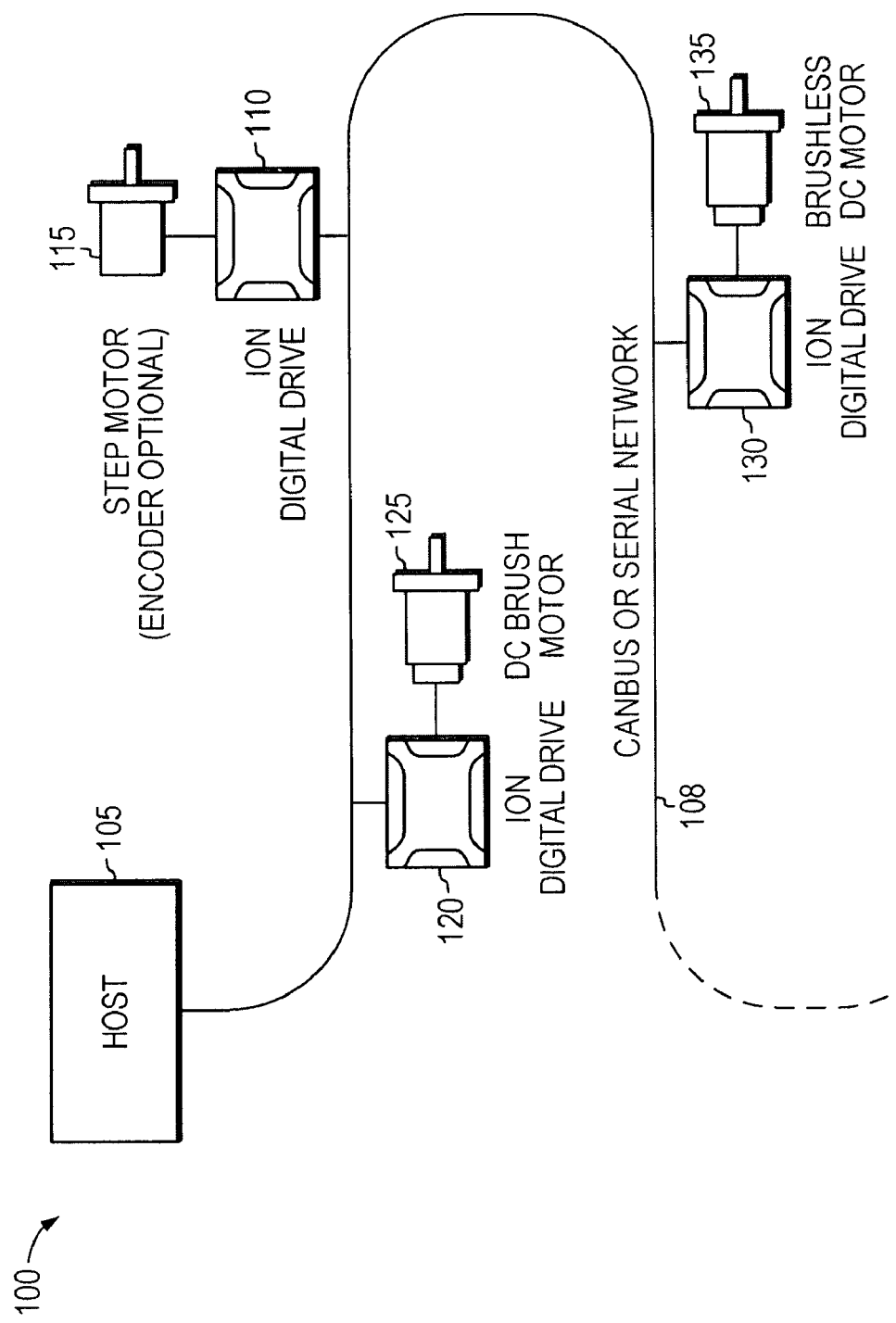
FIG. 1 is a block diagram of an example embodiment of a motor control system.

FIG. 1 is a block diagram of an example embodiment of a motor control system 100 employing motors of different types. The motor control system 100 employs a step motor 115, DC brush motor 125, and brushless DC motor 135. The motor control system 100 may employ other motor types such as an AC induction motor and variable reluctance motor. The step motor 115, DC brush motor 125, and brushless DC motor are connected to and controlled by respective digital drives or motor control modules 110, 120, 130. The motor control modules 110, 120, 130, in turn, may connect to and communicate with a host processor 105 over a motor control data bus 108. The motor control data bus 108 may be any compatible distributed network bus configured in serial or parallel, such as a Controller Area Network (CAN) data bus or an Ethernet bus.

Figure 2:
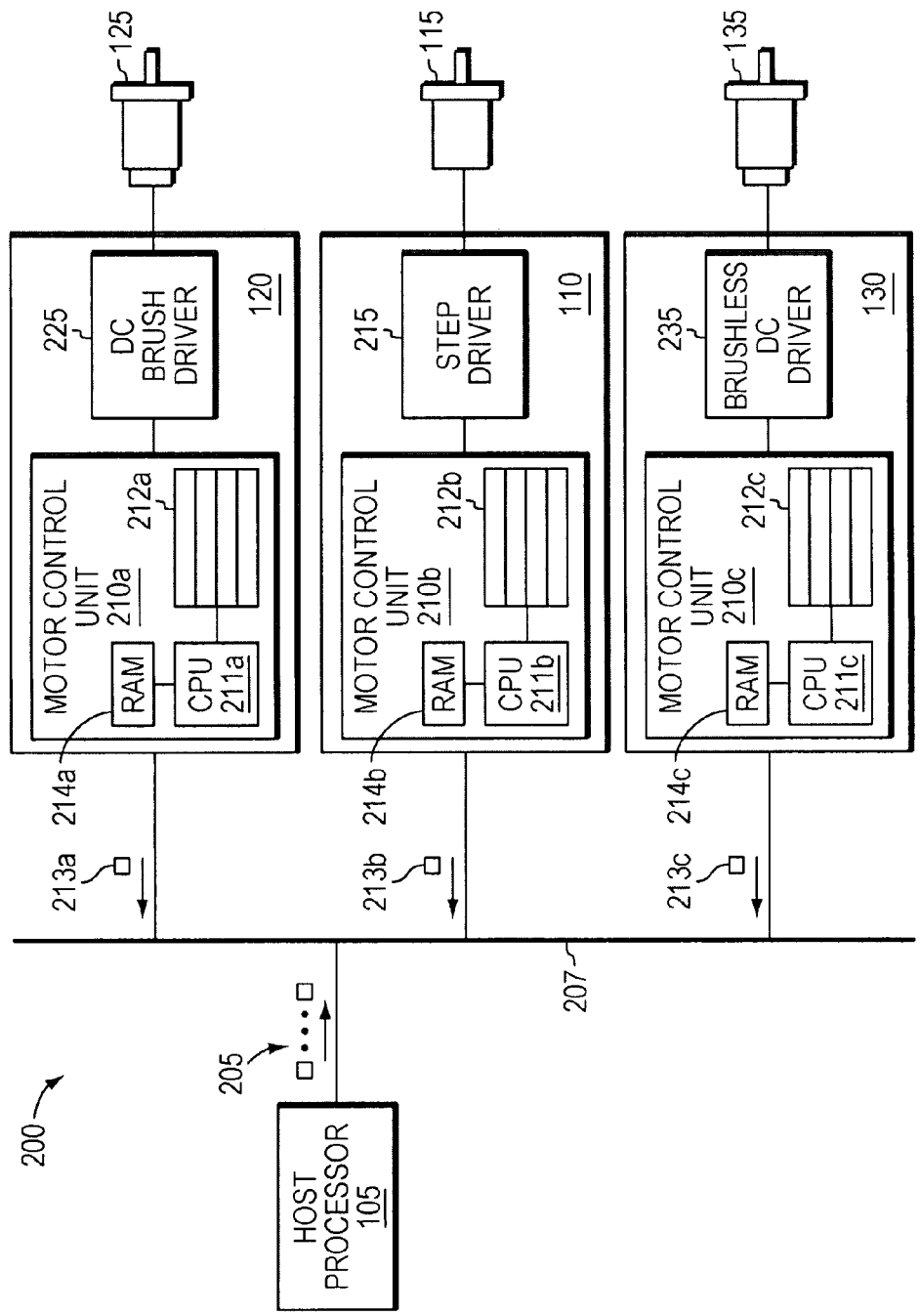
FIG. 2 is a network block diagram of another embodiment of a motor control system illustrating components of example motor control modules for different motor types.

FIG. 2 is a network block diagram of another embodiment of a motor control system 200 illustrating components of example motor control modules for different motor types. The motor control system includes a host processor 105 that communicates with multiple motor control modules 110, 120, 130 over a motor control data bus 207. The motor control modules 110, 120, 130 each include an output power stage or motor driver for a particular motor type. For example, motor control module 120 includes a DC brush driver 225 for a DC brush motor 125, motor control module 110 includes a step driver 215 for driving a stepper motor 115, and motor control module 130 includes a brushless DC driver 235 for controlling a brushless DC motor 135.

The motor control modules 110, 120, 130 also include respective motor control units 210a-c for providing motion commands to respective drivers 215, 225, 235. Each motor control unit 210a-c includes respective processors 211a-c, banks of status registers 212a-c, and memory, such as random access memory (RAM) 214a-c. The RAM 214a-c may be non-volatile random access memory (NVRAM).

According to embodiments of the motor control system 200, the respective banks of status registers 212a-c include status information about the motor control modules 110, 120 130 that is monitored by the respective processors 211a-c. As described further herein, the contents of the banks of status registers 212a-c may be used in breakpoint operations to define a triggering event such as "trigger when bit 8 in the Signal Status register goes low." These registers may also be the source of data for mechanisms to output one or more bits within these registers.

The host processor 105 may query the banks of status registers 212a-c for specific status information in common among the motor control modules 110, 120, 130 for the different motor types. For example, the host processor 105 may send multiple messages 205 to the motor control modules 110, 120, 130 requesting the specific status information contained in the banks of status registers 212a-c. In reply, the processors 211a-c may access the banks of status registers 212a-c and provide respective messages 213a-c to the host processor 105 that include the requested status information.

According to embodiments of the motor control system 200, the status registers in the banks of status registers 212a-c include status information that is in common among the motor control modules 110, 120, 130, regardless of the different types of motors 115, 125, 135 and corresponding motor drivers 215, 225, 235. Thus, a system designer can design a motor control system with very little consideration of the different motor types in the motor control system. For example, a system designer may simply purchase the appropriate motor control modules for the different motor types in the motor control system, update settings in the RAM 214a-c according to a protocol that is common across different motor types, and set up communications between the motor control modules 110, 120, 130 and the host processor. A system operator may then use the host processor 105 to access and read the status information in the banks of status registers 212a-c by sending, in some embodiments, identical messages 205 to the motor control modules 110, 120, 130 to request common status information without regard for the different motor types on the motor control system.

The general concepts of Pulse Width Modulation (PWM) or Digital-to-analog Conversion (DAC) apply to both single-phase (e.g., DC brush) and multi-phase motors (e.g., brushless DC, step motors). Depending on the waveform and the motor output mode selected (PWM or DAC), either two or three output signals per axis will be provided by the motion processor. For DC brush motors, which are single phase devices, each PWM or analog output drives the motor's single coil. For multi-phase motors the scheme differs somewhat depending on whether PWM or analog output mode has been chosen.

Figure 3A:
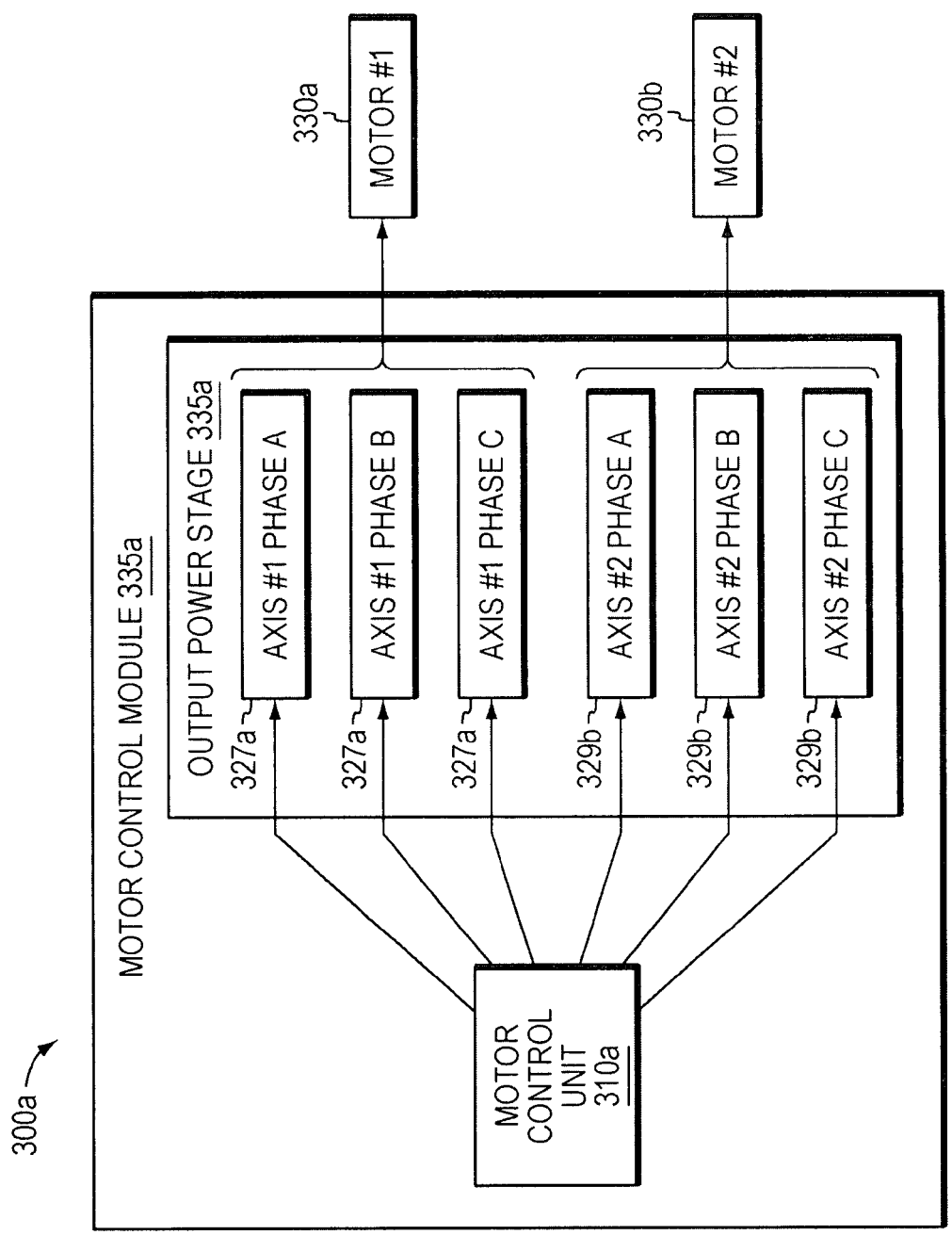
FIGS. 3A and 3B are block diagrams of motor control subsystems illustrating example motor control modules configured to control three-phase motors.
Figure 3B:
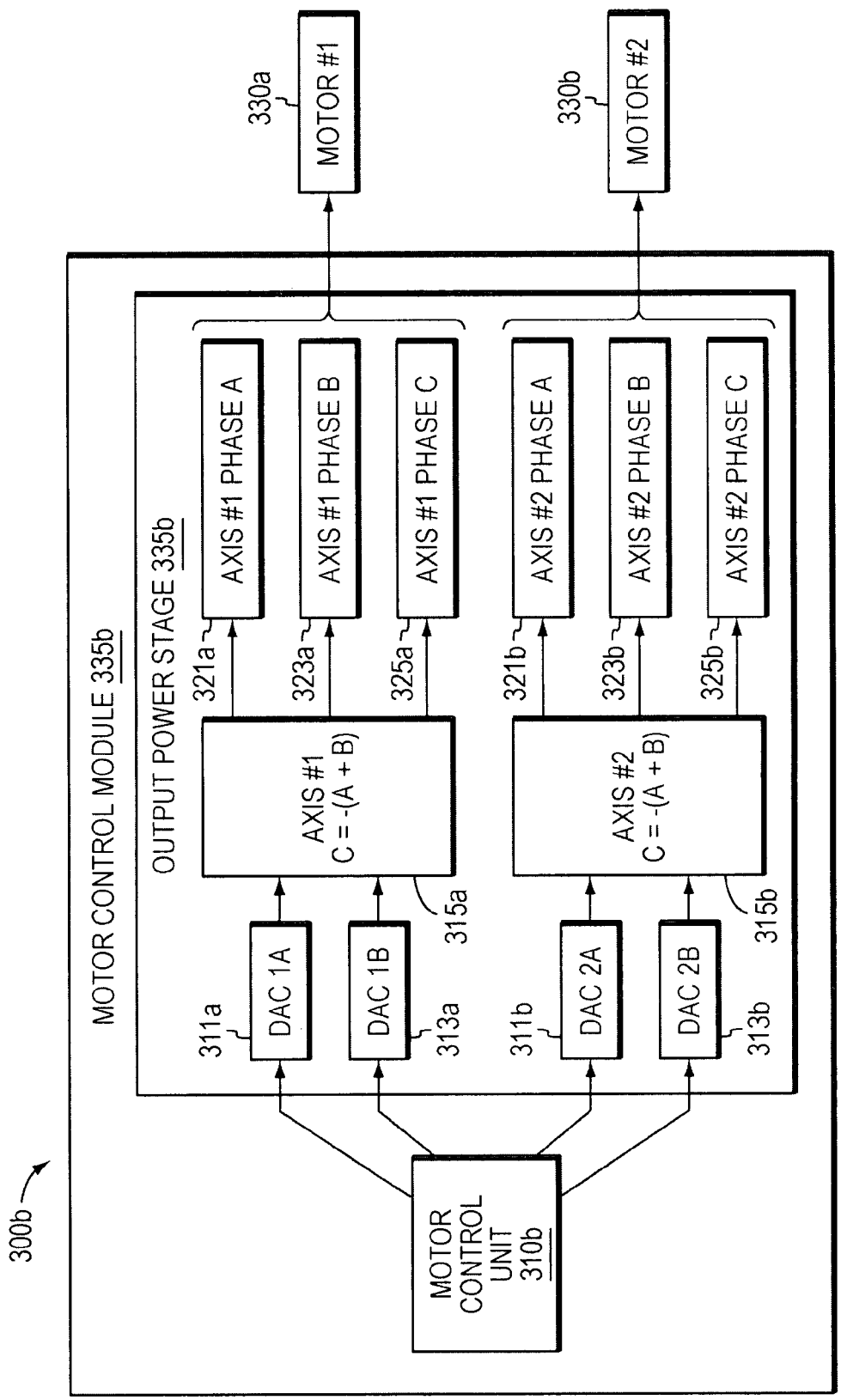

FIGS. 3A and 3B are block diagrams of motor control subsystems 300a-b illustrating example motor control modules 335a-b configured to control two three-phase motors 330a-b. A single-axis embodiment may also be implemented, where a motor control module 335 includes a single-axis configuration to control one motor. In FIG. 3A, the motor control module 335a is configured to operate a three-phase brushless motor in the PWM output mode. In this configuration, the motor control unit 310b outputs three phased PWM magnitude signals per axis. These signals are then fed directly into three half-bridge type voltage amplifiers (three amplifiers 327a-c for the first motor 330a and three amplifiers 329a-c for the second motor 330b) in the output power stage 635.

In FIG. 3B, the motor control module 335b is configured to operate a three-phase brushless motor in the DAC output mode. The motor control module includes a motor control unit 310b and an output power stage 335b. In this configuration, digital words output from the motor control unit 310b are first converted into voltages using Digital-to-analog converters (DACs). As shown in FIG. 3B, two DAC channels are required per axis (DAC 1A 311a and DAC 1B 311b for the first motor 330a and DAC 1A 311a and DAC 1B 311b for the second motor 330b). To generate the third phase for a brushless motor (C phase), the sum of the A and B signals are negated according to the expression $C=-(A+B)$. This is accomplished with op-amp circuits 315a-b. In addition, if current loop control is desired, the three output signals are usually arranged so that the sum of the currents flowing through the windings of the motor are zero. The output signals from the DACs 311a-b, 313a-b and the op-amp circuits 315a-b are then fed into respective amplifiers 321a-b, 323a-b, 325a-b.

Figure 4:
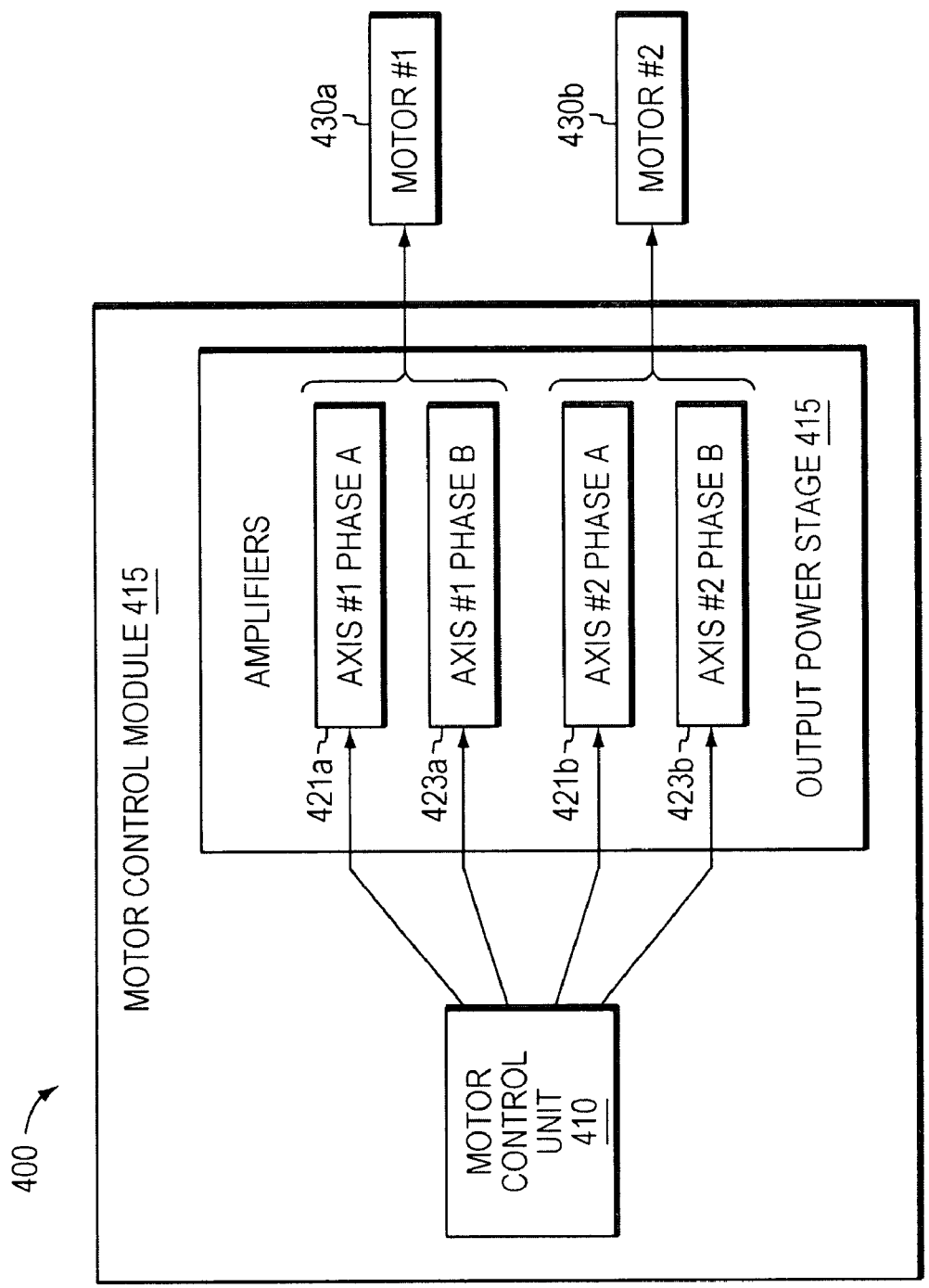
FIG. 4 is a block diagram of a motor control subsystem illustrating an example motor control module configured to control two-phase motors.

FIG. 4 is a block diagram of a motor control subsystem 400 illustrating an example motor control module 415 configured to control two-phase motors, such as step motors, using either the PWM or DAC output modes. Although a two-axis configuration is shown, a single-axis embodiment may also be implemented, where a motor control module 415 includes a single-axis configuration to control one motor. According to the DAC output mode, the digital motor output word from the motor control unit 410 for each phase of the first motor 430a and the second motor 430b is converted into a DC signal with a value ranging between −10 volts and +10 volts. This signal is then input into an amplifier (421a-b, 423a-b) of the output power stage 415, such as an off-the-shelf DC-Servo type amplifier, or any other linear or switching amplifier that performs current control and provides a bipolar, two-lead output. In this configuration, each amplifier drives one phase of the step motor, with the motion processor generating the required sinusoidal waveforms in each phase to perform smooth, accurate motion.

Figure 5:
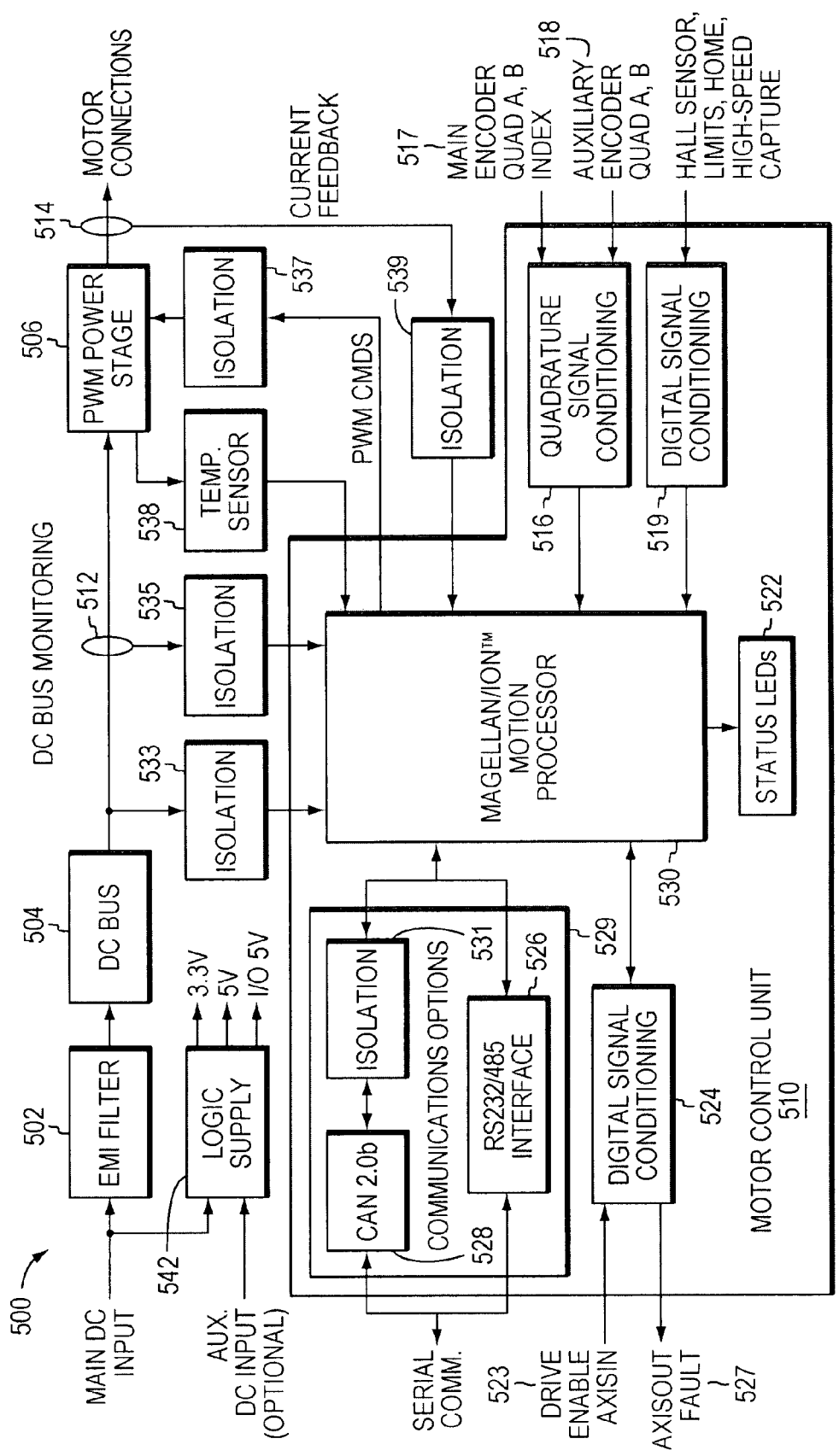
FIG. 5 is a block diagram illustrating elements of an example motor control module which may be employed in the motor control systems of FIGS. 1 and 2.

FIG. 5 is a block diagram illustrating elements of an example motor control module 500 which may be employed in the motor control system of FIG. 1. In some embodiments, some or all of the elements of the example motor control module 100 may be disposed on a PCI card or any other electronics package. The motor control module includes a complete chip-based motion processor 530 that provides trajectory generation and related motion control functions. Depending on the type of motor to be controlled, the motion processor 530 provides servo loop closure, on-board commutation for brushless motors, and high-speed pulse and direction outputs. Thus, the dedicated motion processor 530 can support a large variety of system configurations including motors of different types.

The motion processor 530 architecture may include a high-speed computation unit (not shown) along with an Application Specific Integrated Circuit (ASIC) (not shown). The high-speed computation unit contains special on-board hardware that makes it well suited for the task of motion control. In single-axis/single-chip embodiments of the motion processor 530, the logic provided in the ASIC is integrated directly into the high-speed computation unit.

Embodiments of the motion processor 530 share a similar hardware architecture and most software commands. Therefore, software written for the motion processor 530 may be used with another motion processor, independent of the type of motor connected to the other motion processor or the hardware configuration of another motor control module.

The motion processor 530 may support DC brush, brushless DC, and step motors using both pulse and direction and microstepping output formats. For DC brush motors, brushless DC motors with external commutation, two-phase or three-phase Brushless DC motors, or step motors the motion processor 530 may provide an output in Pulse-width Modulation (PWM) or Digital-to-analog Converter (DAC)-compatible formats. For example, the motion processor 530 may provide PWM commands to a PWM Power Stage 506 via an electrical isolation unit 537. For pulse and direction step motors, the motion processor 530 may provide an output in a pulse and direction format.

The single-chip motion processor 530 may specifically be designed to provide one axis of control with an additional auxiliary axis of encoder input 518. As will be described herein, the motion processor 530 may provide additional amplifier control features such as digital current control and over temperature sense.

In the motor control module 500, some or all of the connections to the motor control module 500 (such as encoder inputs and so forth) may be made available externally to the user while some may be connected to the internal module circuitry. But, regardless of the hardware configuration or motor type, the overall control approach is similar. Each motor axis inputs the actual location of the motor axis to the motion processor 530 using either incremental encoder signals from a relative or quadrature encoder or parallel-word encoder signals from an absolute encoder. Encoder signals may also come from an Analog-to-digital Converter (ADC), resolver, or laser interferometer. If incremental encoder signals are used, the incoming A and B quadrature data stream 517 (e.g., Main Encoder Quad A, B, Index) is digitally filtered and passed on to a high-speed up/down counter (not shown) in a quadrature signal conditioning unit 516. If parallel-word encoder signals are used, a direct binary-encoded position of up to 16 bits may be provided to and read by the motion processor 530. But, regardless of the encoder input method, the motor axis position information from an encoder is then used to maintain a 32-bit actual axis position counter (not shown).

The motion processor 530 includes a trajectory generator that calculates a new desired position of the motor axis at each cycle time interval, which is based on profile modes and parameters programmed by the host processor 105 (see FIG. 1), as well as on the current state of the system. The cycle time is the rate at which major system parameters, such as trajectory, servo compensation, and other motion processor functions, are updated. Profile modes may include S-curve pointto-point (profile parameters include position, velocity, acceleration, deceleration, and jerk), trapezoidal point-to-point (profile parameters include position, velocity, acceleration, and deceleration), velocity-contouring (profile parameters include start velocity, velocity, acceleration, and deceleration), and electronic gearing using the auxiliary differential encoder signals 518 (Quad A, B) (profile parameters include direction and ratio of master axis gear counts to slave axis counts, master motor axis number, and master gear source).

For servo motors, the output of the trajectory generator is combined with the actual encoder position to calculate a 32-bit position error, which is passed through a Proportional-Integral-Derivative (PID) position loop. The motion processor 530 then provides resultant PWM or DAC signals to an external output power stage. For example, the motion processor 530 may provide PWM commands to the PWM Power Stage 506 via the electrical isolation unit 537. If the axis is configured for a brushless DC motor, then the signals output from the motion processor 530 are commutated; meaning the signals are combined with information about the motor phase angle to distribute the desired motor torque to two- or three-phased output commands.

If an axis of the motor control module 500 is configured for a DC brush servo motor, the single-phase motor command is output directly to the PWM power stage 506. If the motor control module 500 axes are configured for step motors, the motion processor 530 converts the output of the trajectory generator (not shown) to either microstepping signals, or pulse and direction signals, and provides these signals to the output power stage in either PWM or DAC format.

The motor control module 500 may provide capabilities for digital current control or field oriented control, along with numerous monitoring and control features. Some of these features are described in more detail herein.

Communication to and from the motion processor 530 is accomplished using a communications unit 529. The communications unit 529 may include an RS232/485 serial interface 526 and a CAN 2.0b interface 528 for serial communications with an external processor through a data bus. The CAN 2.0b interface 528 may connect to the motion processor 530 through an electrical isolation unit 531. The communications unit 529 may also include a parallel-bus interface (not shown). The parallel-bus interface may provide for 8-bit wide data transfers or 16-bit wide data transfers, allowing a range of microprocessors and data buses to be interfaced. For serial communications, a user may select parameters such as baud rate, number of stop/start bits, and the transfer protocol. The transfer protocol may be either point-to-point (appropriate for single-motion processor systems), or multi-drop (appropriate for serial communications to multiple motion processors). For CAN communications, the user may select the desired CAN data bus rate and the CAN node address.

Regardless of the hardware interface method, communication to and from the motion processor 530 occurs using short commands sent or received as a sequence of bytes and words. These packets may contain an instruction code word that tells the motion processor 530 which operation is being requested. It may also contain data sent to, or received from, the motion processor 530.

These commands are sent by the host processor 105 (FIG. 1) or host computer executing a supervisor program that provides overall system control. The motion processor 530 may be designed to function as the motion engine, managing high-speed dedicated motion functions such as trajectory generation, safety monitoring, etc, while the host software program provides the overall motion sequences.

Electrical power, such as DC or AC power is provided to the motor control module 500 through an electromagnetic interference (EMI) filter 502 and a logic power supply 542. The motor control module 500 may include an auxiliary power input to the logic power supply 542. The logic power supply 542 provides power to the logic components in the motor control module 500. For example, the logic power supply 542 provides various voltage levels to the logic components of the motor control module 500, such as the motion processor 530, the communications unit 529, and the signal conditioning blocks 516, 518, 524. The EMI filter 502 filters electromagnetic interference from the input power and provides the filtered power to the PWM power stage 506 through a power bus, such as a DC power bus 504. The PWM power-stage 506, in turn, outputs power to drive a motor in accordance with commands from the motion processor 530. For example, the PWM power stage 506 may modulate power from the DC bus 504 according to PWM commands from the motion processor 530.

The voltage on the power bus 512 is monitored by the motion processor 530 through isolation units 533, 535. The motion processor 530 also monitors current 514 output by the PWM power stage 506 through electrical isolation unit 539. The temperature of the PWM power stage 506 through temperature sensor 538.

The motor control module 500 also includes digital signal conditioning circuits 518, 524 that receive various information from the Input/Output (I/O) pins of the motor control modules 500. Information received by the digital signal conditioning circuits 518, 524 includes data from hull effect sensors and the limit switches, for example. The digital signal conditioning circuits 518, 524 then provide this information in a format suitable for the motion processor 530.

In some embodiments, the motor control module 500 may include status LEDs 522 through which the motion processor 530 may provide status information. For example, the LEDs may be used to indicate various motor drive fault conditions.

The motor control unit may monitor various aspects of the motion of an axis. The motor control unit may include various numerical registers that may be queried to determine the current state of the motor control unit, such as the current actual position, the current commanded position, and so forth.

In addition to these numerical registers, the motor control unit may include bit-oriented status registers that provide a continuous report on the state of a particular axis. These status registers combine a number of separate bit-oriented fields for a specified axis. In various embodiments of the status registers, the status registers is uniform across all motor types.

Figure 6:
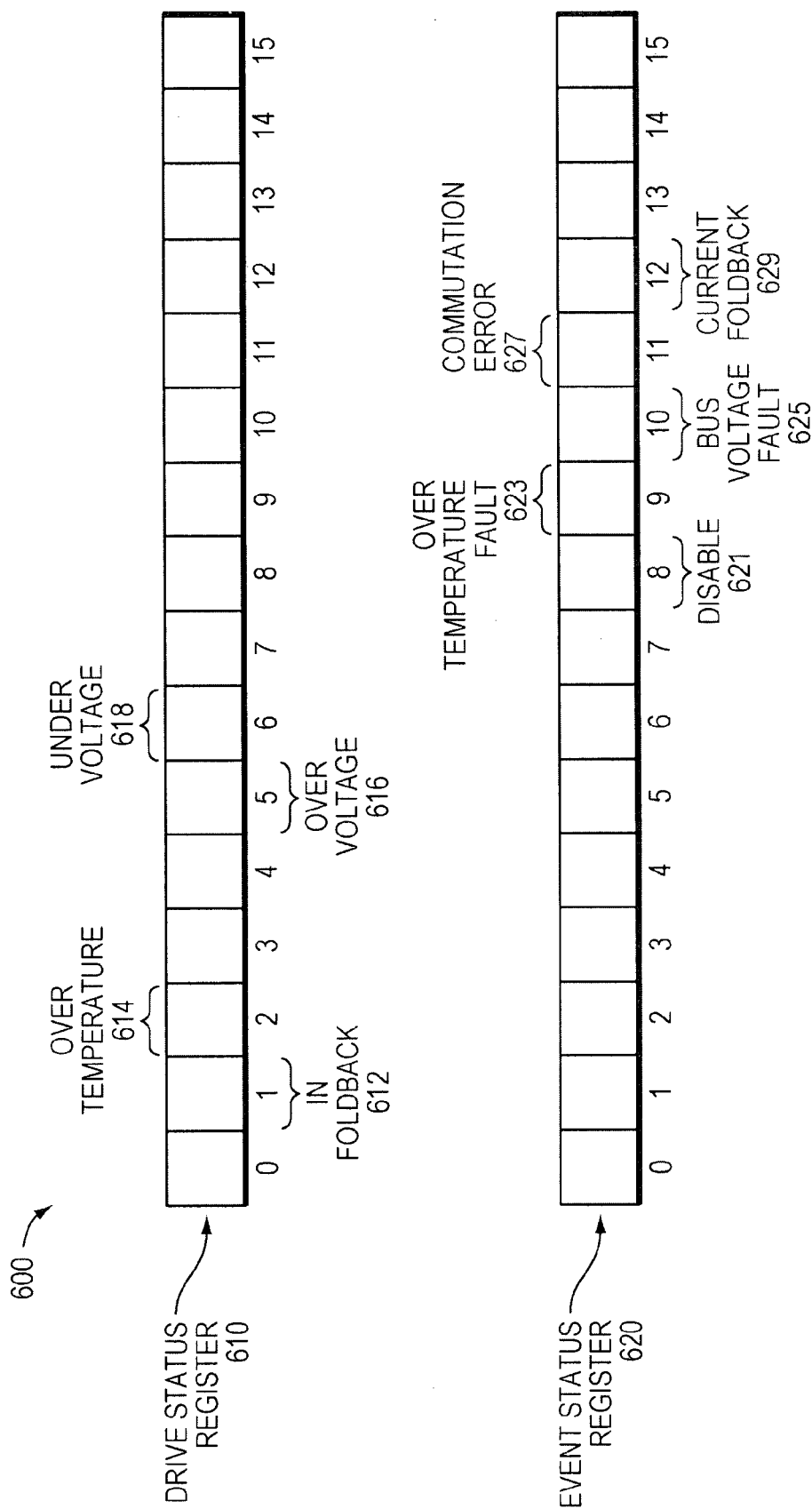
FIG. 6 is a diagram of example status registers employed in embodiments of motor control modules.

FIG. 6 is a diagram of example format of the status registers 600 that may be included in the banks of status registers 212a-c for the different motor types shown in FIG. 2. The banks of status registers 212a-c may include status registers having 16 one-bit fields. The status registers 600 may include a output power stage or drive status register 610 and an event status register 620. The Event Status register 620 records events that do not continuously change in value but rather tend to occur once due to a specific event. As such, each bit in this register is set by the motor control unit and cleared by the host processor. The banks of status registers 212a-c may also include an activity status register and a signal status register.

As shown in FIG. 6, the event status register 620 may include 16 one-bit fields which describe the status of various components or conditions of a motor control module. For example, a disable bit 621 may be set when the user or system operator disables the motor drive by making the enable signal 523 inactive (FIG. 5).

The host processor may issue a command to return the contents of the Event Status register for the specified axis. Bits in the Event Status register are latched. Once set, they remain set until cleared by a host processor instruction or a system reset. Event Status register bits may be reset to "0" using a 16-bit mask. For example, register bits corresponding to "0"s in the 16-bit mask are reset and all other bits are left unaffected.

The one-bit fields of the example Event Status register 620 are defined in the following table:

| Bit | Name | Description |
| --- | --- | --- |
| 0 | Motion complete | Set when a trajectory profile completes. The motion being considered complete may be based on the commanded position, or the actual encoder position. |
| 1 | Position wraparound | Set when the actual motor position exceeds 7FFFFFFFh (the most positive position), and wraps to 80000000h (the most negative position), or vice versa. |
| 2 | Breakpoint 1 | Set when breakpoint #1 is triggered. |
| 3 | Capture received | Set when the high-speed position capture hardware acquires a new position value. |
| 4 | Motion error | Set when the actual position differs from the commanded position by an amount more than the specified maximum position error. The motion processor can be configured to stop motion automatically when this flag is set. |
| 5 | Positive limit | Set when a positive limit switch event occurs. |
| 6 | Negative limit | Set when a negative limit switch event occurs. |
| 7 | Instruction error | Set when an instruction error occurs. |
| 8 | Disable | Set when the user disables the controller by making the enable signal inactive. |
| 9 | Over temperature fault | Set when an over temperature fault occurs. |
| 10 | Bus voltage fault | Set when an over or under voltage fault occurs with the main supply bus voltage. |
| 11 | Commutation error | Set when a commutation error occurs. |
| 12 | Current foldback | Set when current foldback occurs. |
| 13 | Reserved | May contain "1" or "0". |
| 14 | Breakpoint 2 | Set when breakpoint #2 is triggered. |
| 15 | Reserved | May contain "0" or "1". |

Bits 8-12 (621-629) are of particular importance because they relate to safety features associated with a motor drive. A motor control processor (e.g., CPU 211*a* in FIG. 2) may set the disable bit 621 to "1" when a user or external hardware disables an associated motor drive (e.g., motor drive 225 in FIG. 2) by making the drive enable signal 523 (FIG. 5) inactive.

Once the user determines the reason for the drive enable signal 523 becoming inactive and makes appropriate corrections to maintain safe operating conditions of the motor drive and associated electronics, the disable bit 621 may be cleared (i.e., set to "0") by the user via the host processor. However, if the drive enable signal is still inactive while bit 8 of the Event Status register is being cleared, this bit will immediately be set again, and the recovery sequence must be executed again.

The motor control processor may set the overtemperature fault bit 623 to "1" when it determines that a motor drive temperature sensed by a temperature sensor (e.g., temperature sensor 538 in FIG. 5) exceeds a given temperature threshold indicating an over temperature fault. The overtemperature fault bit 623 may be cleared (i.e., set to "0") by the host processor if the motor control processor determines that the motor drive temperature no longer exceeds the given temperature threshold. The given temperature threshold may be programmable by a user but limited by a value less than or equal to the rated maximum for the motor driver.

Over temperature faults indicate that the internal safe limits of the drive temperature range have been exceeded. This potentially serious condition can result from incorrect motor connections or from excessive torque demands placed on the motor drive. In addition to setting the over temperature fault bit 623, the motor control processor may also automatically disable the motor drive in response to the over temperature fault. After the user determines the reason for the fault and makes appropriate corrections, the user may clear the over temperature fault bit 623 of the Event Status register. If the over temperature fault condition still exists at the time the over temperature bit of the Event Status register is cleared, the over temperature bit will immediately be set again, and the user must again determine the reason for the fault and make appropriate corrections.

The motor control processor may set the bus voltage fault bit 625 to "1" when it reads a main supply bus voltage 512 (FIG. 5) provided to the motor drive and determines that it has passed a given voltage threshold. For example, the bus voltage fault bit 625 may be set to "1" when the main supply bus voltage dips below a first given voltage threshold (i.e., an under voltage fault) or exceeds a second given voltage threshold (i.e., an over voltage fault). An over voltage fault indicates that safe limits for the main supply bus voltage have been exceeded. This potentially serious condition can result from back-EMF generation due to high motor or machine inertia, or due to a failure of the main supply bus voltage. The motor control unit may also disable the motor drive in response to an over voltage fault.

After the user determines the reason for the fault and makes appropriate corrections, the bus voltage fault bit 625 may be cleared (i.e., set to "0") by the user through the host processor. The user may clear the bus voltage fault bit 625 so long as the motor control processor determines that the main supply bus voltage, for example, has returned to a level above the first given voltage threshold or below the second given threshold. If the fault condition still exists while the bus voltage fault bit 625 of the Event Status register 620 is being cleared, this bit may immediately be set again, and the user must again determine the reason for the fault and make appropriate corrections before attempting to clear the bus voltage fault bit 625.

The first given voltage threshold may be programmed by the user to have a value equal to or less than a prescribed maximum for the motor drive and the second given voltage threshold may have a value equal to or greater than a prescribed minimum for the motor drive.

A commutation error bit 627 may be set to "1" when a commutation error occurs, such as when the index pulse differs from the actual phase of the motor by greater than a given amount. The communtation bit 625 may be cleared (i.e., set to "0") by the host processor if the difference between the index pulse and the actual phase is less than the given amount.

A current fold-back bit 629 may be set to "1" when the motor control module goes into current foldback (also referred to as $I^2T$ foldback). Current foldback used to protect the motor drive or motor windings from excessive current that may generate excessive heat in the motor drive or motor windings. Current foldback may indicate a serious condition effecting motion stability, smoothness, and performance. The motor control module enters current foldback when the square of the actual motor current (e.g., current feedback 514) that is in excess of a given maximum continuous current, integrated over time, is greater than zero. For example, in one embodiment, when this integrated value reaches the equivalent of two seconds at the given maximum continuous current, the motor control module may go into current foldback. While in current foldback, the actual motor current is clamped to the given maximum continuous current. The motor control module then remains in current foldback until the integrated value returns to zero. If the integrated value returns to zero, the current foldback bit 629 may be cleared (i.e., set to "0") by the user.

The given maximum continuous current value may be programmed by the user to a value less than the maximum continuous current supported by the motor drive. This is useful if the required current limit is due to the motor, rather than the motor drive.

The Activity Status register (not shown), like the Event Status register, tracks various aspects of the motor control module. The Activity Status register bits, however, are not latched, but they are continuously set and reset by the motor control processor to indicate the status of various aspects of the motor control module.

The Drive Status register 610 functions similarly to the Activity Status register in that it continuously tracks various aspects of the motor control module. In other words, the Drive Status register bits are not latched; they are continuously set and reset by the motor control processor to indicate the status of the motor control module. The specific status bits provided by the Drive Status register are defined in the following table:

| Bit | Name | Description |
| --- | --- | --- |
| 0 | Reserved | May contain 0 or 1. |
| 1 | In foldback | Set ("1") when not in foldback, cleared ("0") if in foldback. |
| 2 | Over temperature | Set ("1") when the axis is currently in an over temperature condition. Cleared ("0") if the axis is currently not in an over temperature condition. |
| 3 | Reserved | May contain "0" or "1". |
| 4 | In holding | Set ("1") when the axis is in a holding current condition, cleared ("0") if not. |
| 5 | Over voltage | Set ("1") when the axis is currently in an over voltage condition. Cleared ("0") if the axis is currently not in an over voltage condition. |
| 6 | Under voltage | Set ("1") when the axis is currently in an under voltage condition. Cleared ("0") if the axis is currently not in an under voltage condition. |
| 7-15 | Reserved | May contain "0" or "1". |

As indicated in the table above, the motor control processor may set an in foldback bit 612 to either "1" or "0" depending on whether or not the motor control module goes into or comes out of current foldback. In a similar manner, an over-temperature bit 614 may be set to either "1" or "0" depending on whether the motor control processor determines that the motor drive exceeds a given temperature. The motor control processor may set an over-voltage bit 616 to "1" when it determines that the main supply bus voltage 512 (FIG. 5) provided to the motor drive goes below a given lower voltage level. The motor control processor may then clear bit 616 (i.e., set the over voltage bit 616 to "0") when the main supply bus voltage exceeds the given lower voltage level.

The motor control processor may set an under voltage bit 618 to "1" when it determines that the main supply bus voltage 512 (FIG. 5) provided to the motor drive exceeds a given upper voltage level. The motor control processor may then clear the undervoltage bit 618 (i.e., set the undervoltage bit 618 to "0") when the main supply bus voltage goes below the given upper voltage level. Other bits may be set to describe the status of the motor drive or other components of the motor control module. Depending on the application, when bits 1-2 and 5-6 are set to "1", it may be necessary to power down the system and check for proper operation or service.

The Signal Status register provides real-time signal levels for various motion processor I/O pins. The Signal Status register is defined in the following table:

| Bit | Name | Description |
| --- | --- | --- |
| 0 | A encoder | A signal of quadrature encoder input. |
| 1 | B encoder | B signal of quadrature encoder input |
| 2 | Index encoder | Index signal of quadrature encoder input. |
| 3 | Home/capture | This bit holds the home signal, the HighSpeedCapture signal, or the Index signal, depending on which was set as the high speed capture. |
| 4 | Positive limit | Positive limit switch input. |
| 5 | Negative limit | Negative limit switch input. |
| 6 | Axisin | Generic axis input signal. |
| 7 | Hall1 | Hall effect sensor input number 1. |
| 8 | Hall2 | Hall effect sensor input number 2. |
| 9 | Hall3 | Hall effect sensor input number 3. |
| 10 | AxisOut | Programmable axis output signal. |
| 11-12 | Reserved | May contain "0" or "1". |
| 13 | Enable | Enable signal input. |
| 14 | Fault | Fault signal output. |
| 15 | Reserved | May contain "0" or "1". |

All Signal Status register bits are inputs except bit 10 (AxisOut) and bit 14 (Fault). The bits in the Signal Status register represent the actual hardware signal level combined with the state of a signal sense mask. That is, if the signal level at the motion processor is high, and the corresponding signal mask bit is 0 (do not invert), then the bit read will be "1". Conversely, if the signal mask for that bit is "1" (invert), then a high signal on the pin will result in a read of "0".

The motor control modules may provide a programmable mechanism for reacting to various safety or performance-related conditions. A command, such as SetEventAction, may be used to specify what action should be taken for a given condition. To define an event-related response, both a condition and an action must be specified. The following table lists example Event Status register conditions that can be used to define an event-related action:

| Condition Name | Description |
| --- | --- |
| Motion error | A motion error occurs when the position error exceeds a programmable threshold. |
| Positive limit input | A positive limit event occurs when the corresponding signal input goes active. |
| Negative limit input | A negative limit event occurs when the corresponding signal input goes active. |
| Current foldback | A current foldback event occurs when the motor drive current output goes into a foldback condition. |

The following table describes the actions that can be programmed for these conditions:

| Condition Name | Description |
| --- | --- |
| No action | No action taken |
| Smooth stop | Causes a smooth stop to occur at the current active deceleration rate. The velocity command will be set to zero after event action occurs. |
| Abrupt stop | Causes an instantaneous halt of the trajectory |

-continued

| Condition Name | Description |
| --- | --- |
| | generator. The velocity command will be set to zero ("0") after event action occurs. |
| Abrupt stop with position error clear | Causes an instantaneous halt of the trajectory generator as well as a zeroing of the position error (equivalent to ClearPositionError command). The velocity command will be set to zero ("0") after event action occurs. |
| Disable position loop & higher modules | Disables trajectory generator and position loop module. |
| Disable current loop & higher modules | Disables trajectory generator, position loop, and current loop modules. |
| Disable motor output & higher modules | Disables trajectory generator, position loop, current loop, and motor output modules. |

Once the event condition is programmed, the motor control unit monitors the specified condition continuously and executes the programmed action if it occurs. Upon occurrence, the programmed action is executed, and related actions may occur such as setting the appropriate bit in the Event Status register.

To recover from an event action, a command, such as RestoreOperatingMode, may be used to reset the motor control unit to a previously specified operating mode. However, if the event condition still exists, then the event action may reoccur.

Once programmed, an event action may be in place until reprogrammed. Thus, the occurrence of the event condition may not reset the programmed event action.

Default values may be provided for event-related processing. These defaults may provide safe operation for many typical motion systems. Example default event actions are summarized in the following table:

| Condition | Default Action |
| --- | --- |
| Motion error | Disable position loop and trajectory generator. |
| Positive & Negative Limit | Abrupt stop with position error clear. |
| Current foldback | Disable motor output and higher modules. |

In addition to profiling, servo control, and other standard motion control functions, the motor control module may provide digital current control and digital drive control features for motors of different types using a uniform protocol. Digital current control is a technique that may be used for DC brush, brushless DC, and step motors for controlling the current through each winding or coil of the motor. By controlling the current through the windings of the motor, response times improve and motor efficiency can be increased.

Figure 7:
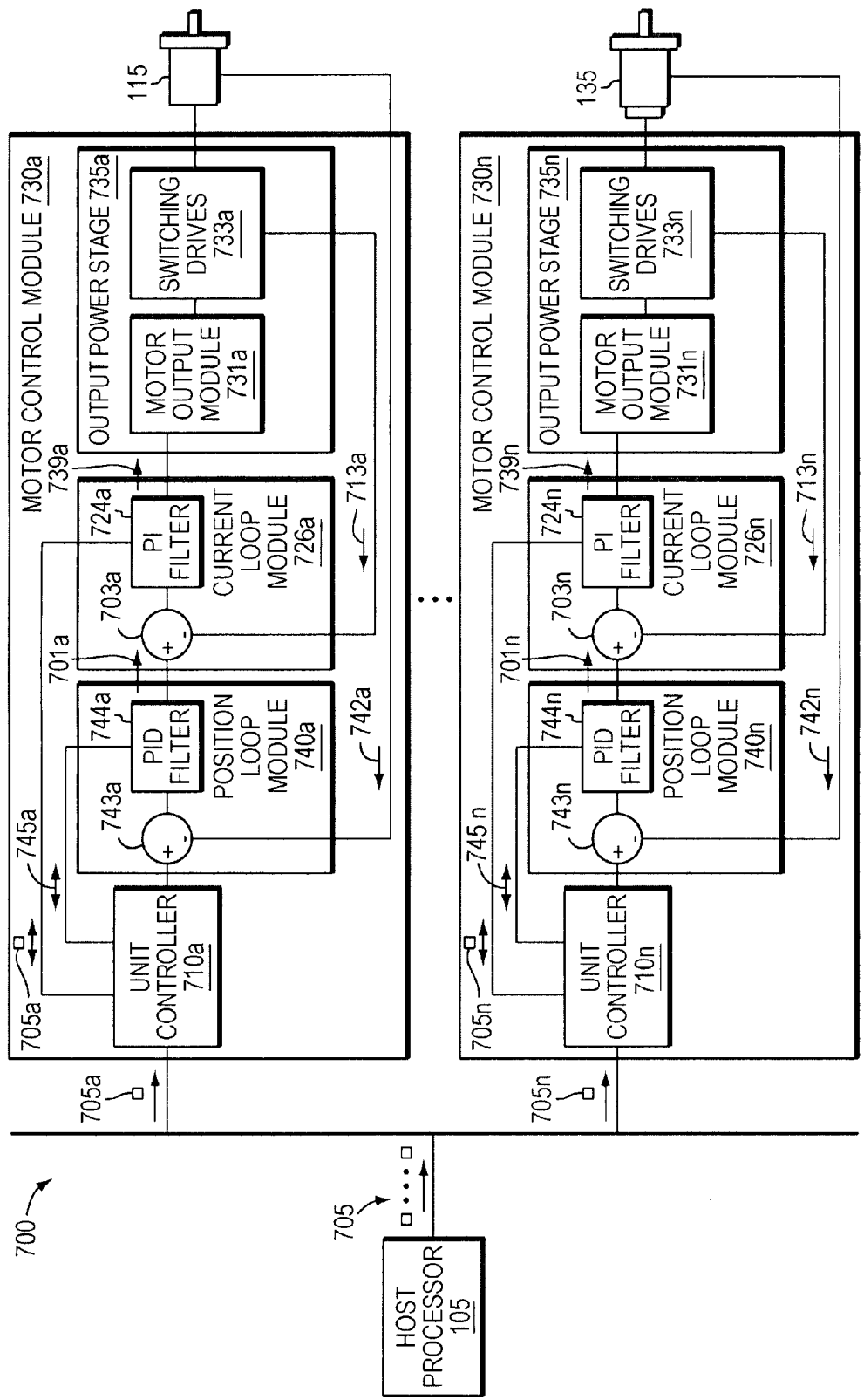
FIG. 7 is a block diagram of an embodiment of a motor control system illustrating elements of example motor control modules.

FIG. 7 is a block diagram of an embodiment of a motor control system 700 illustrating example motor control modules 730*a-n* that employ position loop modules 740*a-n* and current control loop modules 726*a-n*. The current control loop modules 726*a-n* may each include one or more current control loops depending on the number of windings in the motor being controlled. As described further herein, the parameters and variables of the current control loops are the same regardless of the motor type being controlled. The example motor control modules 730*a-n* also include respective unit controller 710*a-n* and output power stages 735*a-n*. The output power stages 735*a-n* include respective motor output modules 731*a-n* and switching drives 733*a-n*. The motor output modules 731*a-n* each may include motor output logic (not shown) that generates the precise PWM timing outputs signals for respective switching drives 733*a-n*.

The position loop modules 740*a-n* provide a feedback loop from the respective motors 115, 135. It compares the commanded motor position and the actual motor position, as received from the unit controller 710 and motor 115, 135, respectively. Based on this comparison, it passes a resultant position error to a proportional-integral-derivative (PID) filter to generate a motor command.

Each position loop module 740*a-n* receives, from the respective motor unit controller 710*a-n*, a control signal to the comparator 743*a-n* indicating a target position. Each comparator 743*a-n* compares this value to the encoder feedback signal 742*a-n* provided by the respective motor 115, 135, and outputs the comparison to each proportional-integral-derivative (PID) module 744*a-n*. The respective PID module 744*a-n* also receives a signal 745*a-n* from the unit controller 710*a-n* indicating the target velocity, and applies a PID algorithm, described in further detail below with reference to FIG. 9. Thus, each position loop module 740*a-n* provides a respective current 701*a-n* derived from the unit controller 710*a-n* control and encoder feedback from a respective motor 115, 135.

A position loop 740 may also be disabled. In such a case, a position loop 740 would operate to bypass the current received from the unit controller 710, passing it to the current loop module 726. For example, a position loop 740 may be disabled when the respective motor control module 730 controls a stepping motor.

Each current loop module 726*a-n* receives a desired current 701*a-n* for each motor winding from respective position loop modules 740*a-n* and an actual measured current 713*a-n* for each motor winding from respective switching drives 733*a-n*. The desired currents 701*a-n* are fed to respective subtraction blocks 703*a-n* in which the desired currents 701*a-n* and respective actual measured currents 713*a-n* are subtracted to develop respective current errors. The current errors are then passed through respective proportional-integral (PI) filters 724*a-n* to generate respective output voltages 739*a-n* for each motor winding.

Figure 8:
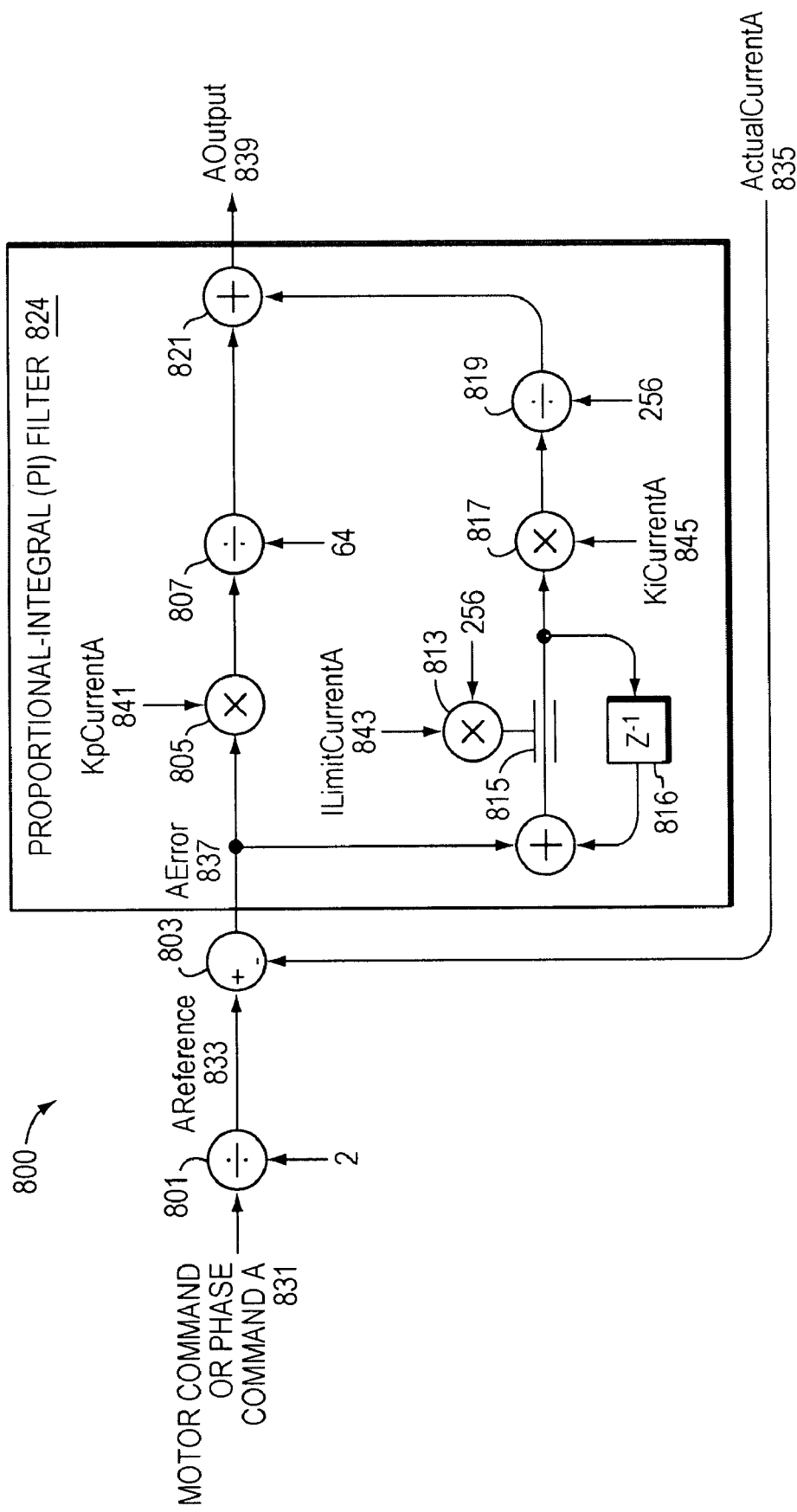
FIG. 8 is a block diagram of an example current control loop that may be employed in an embodiment of a motor control module of FIG. 7.

FIG. 8 is a block diagram of an example current control loop 800 for a single winding of a motor that may be employed in embodiments of the current loop modules of FIG. 7. The current control loop 800 uses the desired current 831 for each motor winding (e.g., Motor Command or Phase Command A for winding A of a motor) along with the actual measured current 835. The desired current 831 is fed to a first division block 801 in which the desired current 831 is divided by two to obtain a reference current 833. The reference current 833 is then fed to a subtraction block 803 in which the reference current 833 and the actual measured current 835 are subtracted to develop a current error 837, which is passed through a proportional-integral (PI) filter 824 to generate an output voltage 839 for each coil of a motor.

In the PI filter 824, the current error 837 is multiplied by a current loop proportional gain (KpCurrentA) 841 in a first multiplication block 805. The result of the multiplication block 805 is then divided by 64 in a second division block 807. In a first addition block 811, the current error 837 is also added to feedback through an integrator block 816. The result of the first addition block 811 is passed through an integration limiter 815 that operates based on the result of the second multiplication block 813, which multiplies a current loop integration limit (ILimitCurrentA) 843 by the number 256. The integration limiter 815 places a boundary on the absolute value that is contributed to the PI filter 824 output by the integrator block 816. Again, the result of the integration limiter 815 feeds back through the integrator block 816. The result of the integration limiter 815 is also multiplied by a current loop integrational gain (KiCurrentA) 845 in a third multiplication block 817 and divided by 256 in a third division block 819. The results from the second and third division blocks 807, 819 are added in a second addition block 821 to obtain an output command 839 for a particular winding of a motor.

For single-phase motors such as DC brush, one current control loop (e.g., current control loop 800) per axis may be used. For three-phase brushless DC motors, two current control loops may be used, one for an A phase and one for a B phase, and the voltage of phase C is driven using the formula C=−(A+B), reflecting the fact that current entering any two coils must exit from the third. When driving two-phase step motors, two current loops may be used, one for the phase A coil and the other for the phase B coil.

For safety reasons the default status of the current control loop modules 726a-n and the motor output modules 731a-n may be disabled after the motor control modules 730a-n are powered on. A command, such as SetOperatingMode, may be used to enable or disable the current control loop modules 726a-n and the motor output modules 731a-n. If during normal operation, a current control loop module (e.g., 726a) is disabled, then the output from the previous module may pass directly to a motor output module (e.g., 731a), with no current control being performed. This configuration may be used, for example, to run a motor control module in voltage mode, which may be useful under some conditions for calibration or testing.

To control the current loop correctly, the three parameters, KpCurrent 841, KiCurrent 845, and ILimitCurrent 843, are set by the user. As described above, the parameters KpCurrent 841 and KiCurrent 845 are gain factors for the PI filter 824, and the parameter ILimitCurrent 843 is a limit for the integral contribution. These three parameters have the following example ranges and formats:

| Term | Name | Representation and Range |
|---|---|---|
| Kpcurrent | Current loop proportional gain | Unsigned 16 bits (0 to 32,767) |
| Kicurrent | Current loop integrational gain | Unsigned 16 bits (0 to 32,767) |
| Ilimitcurrent | Current loop integration limit | Unsigned 32 bits (0 to 2,147,483,647) |

A user may use the host processor 105 to send messages 705a-n to the pI filters 724a-n to either set or read any of these three parameters which are used regardless of the motor type being controlled. For multi-phase motors, the parameters for the phase A and B loops can be set independently. For single-phase DC brush motors, only the phase A loop parameters are set.

The correct parameters for the current control loop gains can be obtained in a number of ways. For example, the current control loops may be auto-tuned using an appropriate software package. The parameters derived in this way may or may not be optimized for particular applications, but may be adequate for most applications. In another example, a system may be modeled and the best settings may be determined through simulation or analysis. The parameters may also be obtained through trial and error.

In one embodiment the variables within the current control loop may be stored in registers, such as status registers, and may be read or tracked. The current control loop variables for different motor types are summarized in the following table:

| Variable Name | Function |
|---|---|
| AReference, BReference | Brushless DC & microstepping motor: These registers hold the commanded (reference) currents for the phase A and phase B coils. DC brush motor: CurrentA holds the commanded (reference) current for the motor. |
| CurrentA, CurrentB | Brushless DC & microstepping motor: These registers hold the measured currents for the phase A and phase B coils. DC brush motor: CurrentA holds the measured current for the motor. |
| AError, BError | Brushless DC & microstepping motor: These registers hold the difference between the current loop reference and the measured current value (CurrentA, CurrentB). DC brush motor: The AError register holds the difference between the current reference and the measured current value (CurrentA). |
| AIntegratorSum, BIntegratorSum | Brushless DC & microstepping motor: These registers hold the sum of the integrator for the phase A and B current loops. DC brush motor: AIntegratorSum holds the sum of the integrator for the current loop |
| AIntegralContribution, BIntegralContribution | Brushless DC & microstepping motor: These registers hold the overall contribution of the integrator for the phase A and B current loops. DC brush motor: AIntegratorContribution holds the overall contribution of the integrator for the current loop |
| AOutput, BOutput | Brushless DC & microstepping motor: These registers hold the output command for the phase A and B current loop. DC brush motor: AOutput holds the output command for the current loop. |

In addition to current control, the motor control module may provide a number of drive control features that improve safety. The drive control features are primarily used to ensure that the motor drive shuts down or is dealt with appropriately in case of an event that may damage the drive. Some of the drive control features may be hard-coded into the motor control module so that they are not under user control to ensure that at all times and under all conditions, safety is not compromised. Other drive control features may allow the user to specify an appropriate response to a condition that may have less severe consequences if not dealt with appropriately.

Embodiments of the motor control module may support automatic detection of major motor drive, voltage supply, or other electrical hardware problems. Some of these problems may be serious electrical fault conditions that require the motor control module's power to be cycled (i.e., turned off and then turned on). Examples of serious electrical fault conditions are described in the following table:

| Fault Name | Description |
|---|---|
| Overcurrent | An overcurrent fault across the motor drive output is detected. This fault occurs when the motor, the wiring leading from the motor drive, or the internal circuitry of the motor drive becomes short circuited. |
| Ground fault | This fault indicates that one or more of the motor |

-continued

| Fault Name | Description |
|---|---|
| | connections are short circuited to the power supply ground. This fault occurs when the motor, the wiring leading from the motor control module to the motor, or the internal circuitry of the motor control module becomes short circuited to ground. |
| External logic fault | This fault indicates that the supply voltage for motor drive logic components external to the motor control processor is too low. This can occur when there is problem with the circuitry external to the motor control processor. |
| Internal logic fault | This fault indicates that there may be a failure with the internal logic of the motion processor. This can occur when the motion processor has experienced anomalous electrical conditions such as excessive supply voltage or excessive voltage on input or output signals. |

The motor control module may be configured to cause the following actions in response to a serious electrical fault condition:
  The motor drive is disabled, thereby halting further motor output.
  A fault out signal is set to active
  The cause of the fault is saved in non-volatile memory.
  The motor control processor enters a special state that requires power to be cycled. Until power is cycled, no commands may be accepted by the motor control processor and no further motor control processing of any kind occurs.

Electrical faults are serious conditions that may warrant utmost precaution before re-powering and re-enabling the motor control module. Thus, in one embodiment, to recover from a serious electrical fault condition, a user may determine the nature of an electrical fault using an appropriate command (e.g., GetDriveFaultStatus). And once the cause of the electrical fault has been corrected, the user may us use an appropriate command to clear the electrical fault condition (e.g., ClearDriveFaultStatus). The latter command is useful for both safety and diagnostic reasons.

To simplify recovery from an electrical fault, as well as to read other drive-related faults, the motor control module may further include a Drive Fault Status register for each motor control module for different motor types that can be read using an appropriate command (e.g., GetDriveFaultStatus). The bits in this register may operate similarly to the bits in the Event Status register in that they are set by the motor control processor, and cleared by the user via a host processor. The following table indicates example contents of this register:

| Bit | Name | Description |
|---|---|---|
| 0 | Over current | Indicates an electrical fault due to a short circuit or overload in the motor drive output. |
| 1 | Ground fault | Indicates an electrical fault due to a short in the motor drive output. |
| 2 | External Logic fault | Indicates an electrical fault located in the motor drive's circuitry. |
| 3 | Reserved | May contain "0" or "1". |
| 4 | Internal Logic fault | Indicates an electrical fault located in the motor control unit's circuitry. |
| 5 | Over voltage | Indicates an over voltage condition of the bus voltage input to the motor drive. |
| 6 | Under voltage | Indicates an under voltage condition of the bus voltage input to the motor drive. |
| 7-15 | Reserved | May contain "0" or "1". |

In some embodiments of the motor control unit, a portion of the contents of the drive fault status register may be saved after a power cycle. Thus electrical faults associated with bits 0, 1, 2, and 4, which cause all communications with the motor control module to cease, and require the unit power to be cycled, may be diagnosed once the condition has been corrected and the unit has been powered up normally. The Over voltage and Under voltage status bits may not be saved, but may be cleared during a power cycle so that they always reflect the latest voltage fault status.

The fault out signal 527 (FIG. 5) may be used to indicate an occurrence of one or more of the electrical faults indicated in the drive fault status register or any other condition associated with the motor control module. In some embodiments, any bit condition of the Event Status register may be used to trigger activation of the fault out signal. This may be accomplished using a command to set a fault out mask (e.g., SetFaultOutMask). The additional bit conditions of the Event Status register specified using the command to set the fault out mask are logically ORed with the electrical fault conditions. That is, additional conditions may be added that trigger the fault out signal. For example, programming the fault out mask with a value of 1200 h configures the fault out signal to be driven high upon an over temperature condition, current foldback condition, or electrical fault. But, in some embodiments, the user may not disable activation of the fault out signal based on non-programmable conditions.

The motor control unit may be programmed with breakpoints so that the motor control unit executes an action based upon a specific condition. Depending on the breakpoint instruction's arguments, a breakpoint can cause an update, an abrupt stop, a smooth stop, it can disable specific modules, or it can cause no action at all.

Each axis may contain two programmable breakpoints. In this manner, two completely separate conditions may be monitored and acted upon. These two breakpoints may be referred to as breakpoint 1 and breakpoint 2. Each breakpoint may include six components: the breakpoint axis, the source axis for the triggering event, the event itself, the action to be taken, the breakpoint update mask associated with the action, and the comparison value. These components are described in the following table.

| Breakpoint component | Description |
|---|---|
| Breakpoint axis | The axis on which the specified action is to be taken. |
| Source axis | The axis on which the triggering event is located. It can be the same as or different than the breakpoint axis. Any number of breakpoints may use the same axis as a source axis. |
| Trigger condition | The event or condition that causes the breakpoint. |
| Action | The sequence of operations executed by the motion processor when the break-point is triggered. After a breakpoint is triggered, the action is performed on the breakpoint axis, using the breakpoint update mask specified for the breakpoint axis. |
| Breakpoint update mask | The mask that controls whether profile and/or position loop and/or current loop parameters will be transferred into the active registers upon occurrence of a breakpoint trigger. |
| Comparison value | The value used in conjunction with the action to define the breakpoint event. |

These parameters provide great flexibility in setting breakpoint conditions. By combining these components, almost any event on any axis can cause a breakpoint. The host processor may send commands to send the breakpoint axis, the trigger, the source axis, and the action and to retrieve these values.

When the motor control module receives a command to set a breakpoint, the breakpoint will become active. That is, the motion processor will begin to compare the conditions specified by the breakpoint with the actual conditions present in the motor control unit. This means that any other information for the breakpoint to function (such as comparison value and breakpoint update mask) should already be loaded before this command is sent.

The host processor may send commands to set the comparison value and to retrieve the comparison value for each breakpoint.

In one embodiment, the motor control unit may support the following breakpoint trigger conditions:

| Trigger Condition | Level or Threshold | Description |
|---|---|---|
| Greater Or Equal Commanded Position | threshold | Satisfied when the current commanded position is equal to or greater than the programmed compare value. |
| Lesser Or Equal Commanded Position | threshold | Satisfied when the current commanded position is equal to or less than the programmed compare value. |
| Greater Or Equal Actual Position | threshold | Satisfied when the current actual position is equal to or greater than the programmed compare value. |
| Lesser Or Equal Actual Position | threshold | Satisfied when the current actual position is equal to or less than the programmed compare value. |
| Commanded Position Crossed | threshold | Satisfied when the current commanded position crosses (is equal to) the programmed compare value. |
| Actual Position Crossed | threshold | Satisfied when the current actual position crosses (is equal to) the programmed compare value. |
| Time | threshold | Satisfied when the current motion processor time (in number of cycles since power-up) is equal to the programmed compare value. |
| Event Status | level | Satisfied when the Event Status register matches bit mask and high/low pattern in programmed compare value. |
| Activity Status | level | Satisfied when the Activity Status register matches bit mask and high/low pattern in programmed compare value. |
| Drive Status | level | Satisfied when the Drive Status register matches bit mask and high/low pattern in programmed compare value. |
| Signal Status | level | Satisfied when the Signal Status register matches bit mask and high/low pattern set in programmed compare value. |
| none | — | Disables any previously set breakpoint. |

Threshold-triggered breakpoints use the breakpoint value set by a command from the host processor as a single 32-bit threshold value to which a comparison is made. When the comparison is true, the breakpoint is triggered. For example, if it is desired that the trigger occur when the commanded position is equal to or greater than 1,000,000, then the comparison value loaded using the command to set a breakpoint value would be 1,000,000, and the trigger selected would be the greater or equal commanded position.

To set a level-triggered breakpoint, the host processor supplies two 16-bit data words: a trigger mask, and a sense mask. These masks may be set using an instruction to set a breakpoint value. The high word of data passed with this command may be the trigger mask value; the low word may be the sense mask value.

The trigger mask determines which bits of the selected status register are enabled for the breakpoint. A value of "1" in any position of the trigger mask enables the corresponding status register bit to trigger a breakpoint. A value of "0" in the trigger mask disables the corresponding status register bit. If more than one bit is selected, then the breakpoint will be triggered when any selected bit enters the specified state.

The sense mask determines which state of the corresponding status bits causes a breakpoint. Any status bit that is in the same state (i.e., "1" or "0") as the corresponding sense bit, is eligible to cause a breakpoint (assuming that it has been selected by the trigger mask).

For example, if the drive status register breakpoint has been selected, and the trigger mask contains the value 0044 h and the sense mask contains the value 0004 h, then the breakpoint will be triggered when bit 2 (the over temperature indicator) assumes the value "1", or bit 6 (the under voltage indicator) assumes the value "0".

Once a breakpoint has been triggered, the motor control unit may be programmed to perform one of the following instruction sequences:

| Action | Description |
|---|---|
| None | No action taken, however breakpoint bit in event status word still set. |
| Update | Will transfer the double buffered registers specified by the Set Breakpoint Update Mask command. |
| Smooth Stop | Causes a smooth stop to occur at the current active deceleration rate. Velocity command will be set to zero ("0") after breakpoint occurs. |
| Abrupt Stop | Causes an instantaneous halt of the trajectory generator. Velocity command will be set to zero ("0") after breakpoint occurs. |
| Abrupt Stop with position error clear | Causes an instantaneous halt of the trajectory generator as well as a zeroing of the position error. Velocity command will be set to zero ("0") after breakpoint occurs. |
| Disable position loop & higher modules | Disables trajectory generator and position loop module. |
| Disable current loop & higher modules | Disables trajectory generator, position loop, and current loop modules. |
| Disable motor output & higher modules | Disables trajectory generator, position loop, current loop, and motor output modules. |

Once a breakpoint condition has been satisfied, the event status bit that corresponds to the breakpoint may be set, and the breakpoint may then be deactivated. To deactivate a breakpoint, "none" may be specified for the breakpoint trigger.

Figure 9:
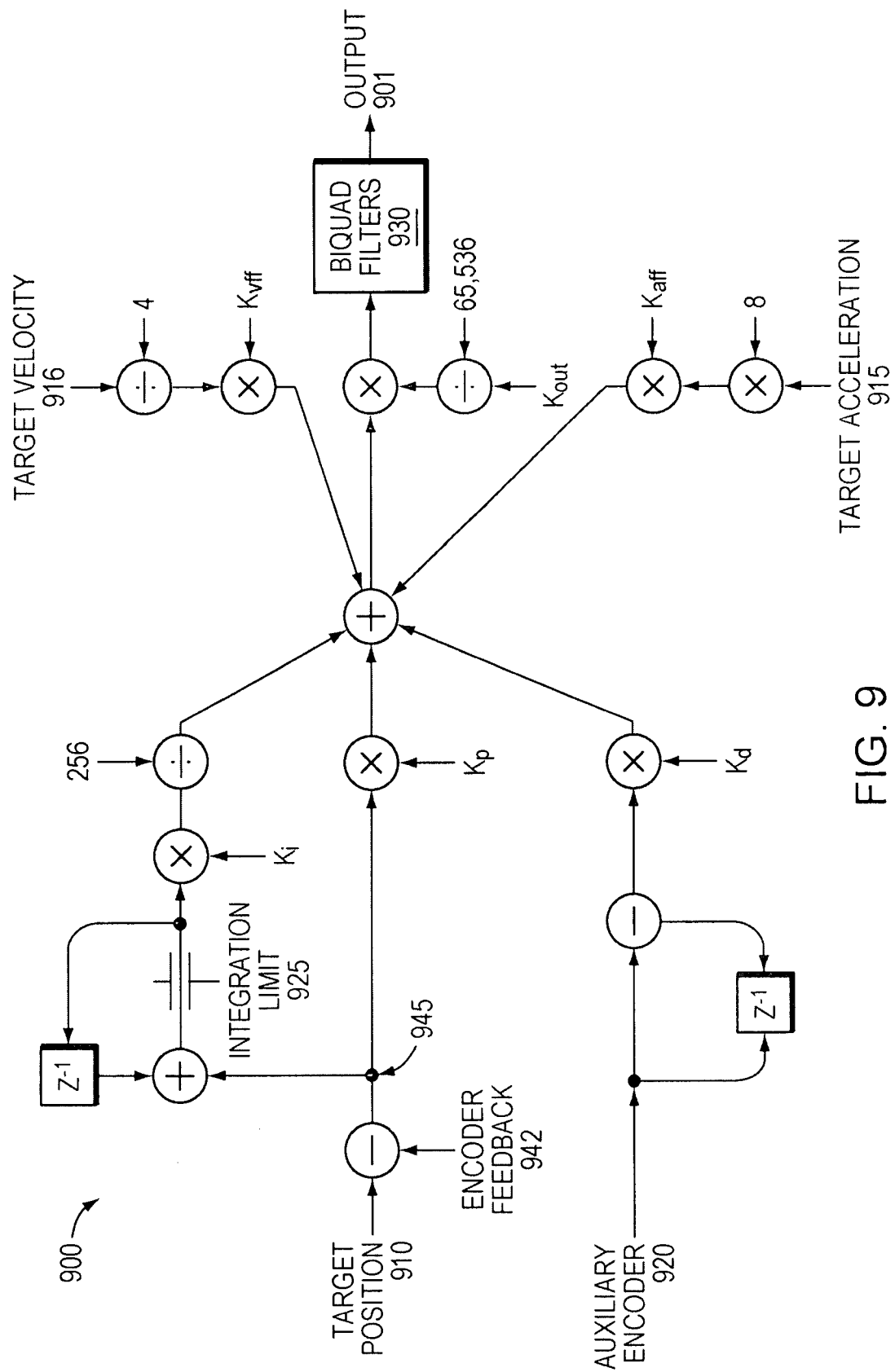
FIG. 9 is a flow diagram of an example position loop module that may be employed in an embodiment of a motor control module of FIG. 7

FIG. 9 is a flow diagram of a position loop 900 employing a proportional-integral-derivative (PID) algorithm, and may be implemented in embodiments of the position loop modules 740a-n at the motor control modules 730a-n of FIG. 7. Typically, a position loop 900 is useful when controlling a servo motor such as a DC servo or a brushless DC motor, but may also be implemented in controlling a step motor. The position loop 900 receives inputs target position 910, target acceleration 915 and target velocity 916 from a controller of the MCU such as the unit controller 710a of FIG. 7. The position loop 900 also receives the input encoder feedback 942 from a respective motor, and provides an output 901 to a current loop module (such as the current loop module 726a of FIG. 7), the output 901 being filtered by biquad filters 930. Input auxiliary encoder 920 may also be received to augment the primary encoder. The auxiliary encoder input 920 may be disabled or, alternatively, omitted from the position loop 900.

The position loop 900 operates to verify that the position of the motor follows the position commanded by the MCU. It does so by combining the commanded value, received as the target position 910, with the encoder feedback 942 to create a position error 945. The position error 945 is then filtered by the PID algorithm comprising the logic as shown. The resulting value may be filtered further by one or more biquad filters 930, which perform frequency-domain filtering such as notch, lowpass and bandpass. The generated position loop output 901 may be output to the current loop or other successive module, the output 901 providing a filtered position error of the motor. In order to accommodate particular amplifiers, motors or physical systems in communication with the position loop, the generated output 901 may be further limited to a prescribed range.

The values shown at the position loop 900 are selected to provide the filtered position error of the motor as described. In this example, the values are selected to satisfy the representative equation:

$$Output_n = \left[ K_P E_n + K_d(Ek - Ek-1) + \sum_{j=0}^{n} E_j * \frac{K_i}{256} + K_{vff}\left(\frac{CmdVel}{4}\right) + K_{aff}(CmdAccel * 8) \right] * \frac{Kout}{65{,}536}$$

The equation values are defined in the table below. The position loop 900 parameters may be programmed to accommodate a given application, and are represented by the range of values below:

| Term | Name | Representation and Range |
|---|---|---|
| $I_{limit}$ | Integration Limit | Unsigned 32 bits (0 to 2,147,483,647) |
| $K_i$ | Integral Gain | Unsigned 16 bits (0 to 32,767) |
| $K_d$ | Derivative Gain | Unsigned 16 bits (0 to 32,767) |
| $K_p$ | Proportional Gain | Unsigned 16 bits (0 to 32,767) |
| $K_{aff}$ | Acceleration feed-forward | Unsigned 16 bits (0 to 32,767) |
| $K_{vff}$ | Velocity feed-forward | Unsigned 16 bits (0 to 32,767) |
| $K_{out}$ | Output scale factor | Unsigned 16 bits (0 to 32,767) |
| Derivative Tine | Derivative Sampling Time | Unsigned 16 bits (1 to 32,767) |
| k | n − modulus (n/derivative time) | — |
| $E_n$ | Position loop error (Commanded Position − Actual Position) | — |
| $E_k$ | Position loop error at the derivative sampling interval | — |

The integration limit 925 ($I_{limit}$) limits the absolute value that is contributed to the PID output by the integration term. Setting the integration limit 925 to greater than zero (0) enables the integral gain $K_i$. The $K_{out}$ parameter can scale down the output of the PID filter by multiplying the filter result by $K_{out}$, which may increase the useable range of $K_p$. The integration limit $I_{limit}$ 925, integral gain $K_i$ and other parameters can be set by programming the values with a host instruction at the host processor 105 (FIG. 1).

While this invention has been particularly shown and described with references to example embodiments thereof, it will be understood by those skilled in the art that various changes in form and details may be made therein without departing from the scope of the invention encompassed by the appended claims.

What is claimed is:

1. A motor control module, comprising:
an output power stage configured for a particular motor type;
a motor control unit coupled to the output power stage, the motor control unit configured to monitor status information about the motor control module including status information about the output power stage; and
status registers coupled to the motor control unit, the status registers having a format independent of motor type, the motor control unit configured to update the status information in the status registers;
the status registers including a drive status register, the drive status register indicating the status information about the output power stage.

2. The motor control module according to claim 1, wherein the status information about the output power stage includes a voltage input to the output power stage, temperature of the output power stage, and current output by the output power stage.

3. The motor control module according to claim 1, wherein the status information includes status information about a current control loop coupled to the output power stage.

4. The motor control module according to claim 3, wherein the status information about the current control loop includes a commanded current, measured current, difference between the commanded and measured currents, sum of an integrator of the current control loop, overall contribution of the integrator, and output command for the current control loop.

5. The motor control module according to claim 1, wherein the status registers include an event status register, activity status register, and signal status register.

6. The motor control module according to claim 1, wherein the motor types include a DC brush motor, brushless DC motor, step motor, AC induction motor, and variable reluctance motor.

7. The motor control module according to claim 1, wherein the motor control unit further includes a processing unit coupled to the output power stage and the status registers, the processing unit configured to update the status registers.

8. The motor control module according to claim 1, wherein the status registers include an event status register, the motor control unit configured to clear at least one bit in the event status register based on a message from a host processor in communication with the motor control module.

9. The motor control module according to claim 1, wherein the motor control module further includes a communications unit coupled to the motor control unit, the communications unit configured to report the status information to a motor control data bus.

10. The motor control module according to claim 9, wherein the communications unit includes at least one of a serial, parallel, Controller Area Network (CAN) and Ethernet interface.

11. A motor control module, comprising:
an output power stage configured for a particular motor type;
a motor control unit coupled to the output power stage, the motor control unit configured to monitor status information about the output power stage and update settings of the motor control module, the settings being independent of motor type; and a drive status register configured to store at least a subset of the settings, the subset indicating the status information about the output power stage.

12. The motor control module according to claim 11, wherein the settings include conditions and corresponding actions.

13. The motor control module according to claim 12, wherein the conditions include current foldback.

14. The motor control module according to claim 12, wherein the conditions include a level or threshold breakpoint trigger condition and the actions include breakpoint actions.

15. The motor control module according to claim 12, wherein the actions include abrupt stop with position error clear, disable trajectory generator, disable position loop, disable current loop, and disable motor output.

16. The motor control module according to claim 11, wherein the settings include current control loop parameters.

17. The motor control module according to claim 16, wherein the current control loop parameters include proportional gain, integral gain, and integration limit.

18. A method of controlling a motor of a particular motor type, the method comprising:
monitoring status information about a motor control module including a power output stage configured for a motor of a particular motor type, the status information being in a format independent of motor type; and
updating the status information about the motor control module in status registers based on said monitoring, the updating including updating status information about the output power stage in the status registers.

19. The method according to claim 18, wherein the status information about the output power stage includes a voltage input to the output power stage, temperature of the output power stage, and current output by the output power stage.

20. The method according to claim 18, wherein the status information includes status information about a current control loop of the motor control module.

21. The method according to claim 20, wherein the status information about the current control loop includes a commanded current, measured current, difference between the commanded and measured currents, sum of an integrator of the current control loop, overall contribution of the integrator, and output command for the current control loop.

22. The method according to claim 18, wherein the status registers include an event status register, an activity status register, and a signal status register.

23. The method according to claim 18, wherein the motor types include a DC brush motor, brushless DC motor, step motor, AC induction motor, and variable reluctance motor.

24. The method according to claim 18, wherein updating the status information includes updating the status information at regular intervals or in response changes in the status information.

25. A method of controlling a motor of a particular motor type, the method comprising:
receiving a message to update settings of a motor control module including a power output stage configured for a particular motor type, the format of the settings being independent of motor type; and
updating the settings of the motor control module based on the message, the updating including updating status information about the output power stage.

26. The method according to claim 25, wherein the settings include conditions and corresponding actions.

27. The method according to claim 26, wherein the conditions include current foldback.

28. The method according to claim 26, wherein the conditions include a level or threshold breakpoint trigger condition and the actions include breakpoint actions.

29. The method according to claim 26, wherein the actions include abrupt stop with position error clear, disable trajectory generator, disable position loop, disable current loop, and disable motor output.

30. The method according to claim 25, wherein the settings include current control loop parameters.

31. The method according to claim 30, wherein the current control loop parameters include proportional gain, integral gain, and integration limit.

32. A motor control system, comprising:
a motor control data bus for carrying motor information; and
plural motor control modules for different motor types coupled to the motor control data bus, each motor control module including:
an output power stage for a particular motor type; and
a motor control unit coupled to the output power stage and configured to monitor status information about the output power stage, the motor control unit including status registers configured to store status information about the motor control module, the status information having a format common among the plural motor control modules;
the status registers including a drive status register, the drive status register configured to store the status information about the output power stage.

33. The motor control system according to claim 32, further comprising a host controller coupled to the plural motor control modules via the motor control data bus, the host controller configured to retrieve the common status information by sending a message to the plural motor control modules.

34. A motor control system, comprising:
a motor control data bus for carrying motor information; and
plural motor control modules for different motor types coupled to the motor control data bus, each motor control module including:
an output power stage for a particular motor type;
a motor control unit coupled to the output power stage, the motor control unit configured to update settings of the motor control module in a format common among the plural motor control modules based on a message from the motor control data bus; and
a drive status register configured to store settings indicating status of the output power stage.

* * * * *